Sept. 9, 1924.  
J. W. S. TUCKER  
SAFETY DEVICE  
Filed June 6, 1924

1,507,802

J. W. S. Tucker, Inventor

By C. A. Snow & Co.
Attorneys

Patented Sept. 9, 1924.

1,507,802

UNITED STATES PATENT OFFICE.

JOHN WILLIAM STOKES TUCKER, OF MIAMI, FLORIDA.

SAFETY DEVICE.

Application filed June 6, 1924. Serial No. 718,293.

*To all whom it may concern:*

Be it known that I, JOHN W. STOKES TUCKER, a citizen of the United States, residing at Miami, in the county of Dade and State of Florida, have invented a new and useful Safety Device, of which the following is a specification.

The present invention relates to a combined bumper and fender especially designed for use on motor vehicles and aims to provide novel means which may be readily and easily manipulated by the operator of the vehicle to prevent persons from being injured, should they fall in the path of travel of a vehicle equipped with the device.

Another important object of the invention is to provide a device of this character which may be folded to a position to guard the radiator under normal conditions, thereby insuring against vehicles backing into the front of the vehicle while parked, to injure the radiator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figures 1, 2, 3:
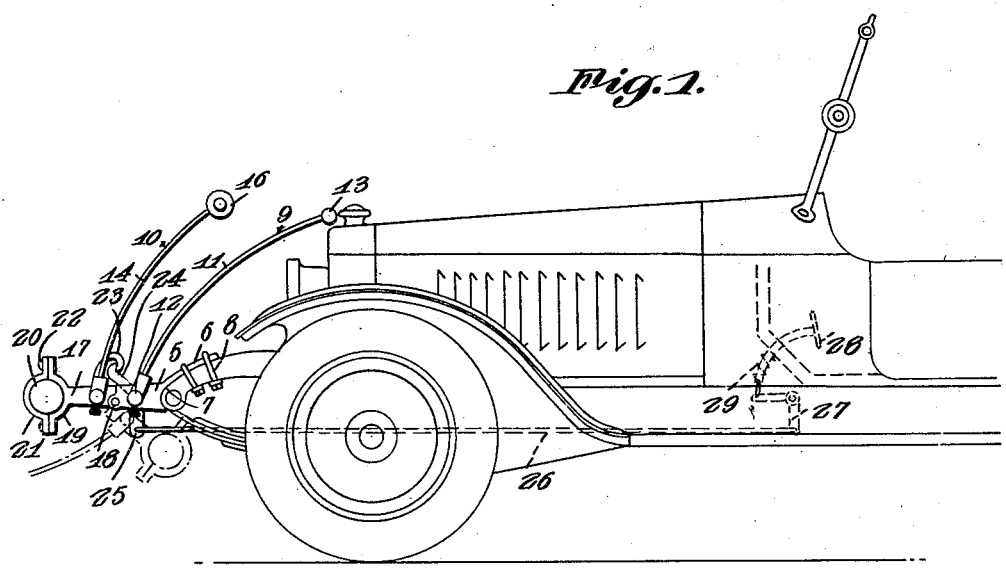
Figure 1 is a side elevation disclosing a combined fender and bumper constructed in accordance with the invention as positioned thereon.
Figure 2 is a front elevational view thereof, showing the guard in its inactive position.

Figure 3 discloses the detail construction of the device by means of which the fender may be adjusted for positioning on vehicles of various sizes.

Referring to the drawing in detail, the device includes a pair of supporting arms indicated by the reference character 5, each of which arms being provided with a curved extension 6 and a cut out portion 7, the cut out portion being designed to fit around the end of a spring member of a motor vehicle, while the extension 6 fits over the forward ends of the side rails of the motor vehicle chassis to which the device is secured, U-bolts 8 being provided to embrace portions of the extension 6 and side rails of the chassis to secure the supporting arms against movement.

The device forming the essence of the invention includes an inner guard indicated by the reference character 9 and an outer guard indicated at 10, the inner guard including a plurality of rearwardly curved rods 11 that have their lower ends secured to the rod 12, the outer ends being connected with the rod 13 in a manner to guard the forward portion, or radiator of the machine.

The outer guard 10 also includes a plurality of spaced rods 14 also curved rearwardly and having their outer ends connected with the rod 15 on the ends of which are mounted rollers 16. These rollers are adapted to rest on the ground surface when the outer guard is thrown to its active position, to support the weight of the person caught in the fender and eliminate any possibility of the fender catching on an obstruction, when in its active position.

The forward or movable section of the fender is mounted on the arms 17, which are pivotally connected with the arms 5 at 18, the arms 17 having curved, forward portions 19 adapted to accommodate the tubular bumper 20 which is held to the arms 17 by means of the straps 21 which are bolted to the curved portions of the arms 17 at 22.

An upwardly extended hook member 23 has connection with the movable section and cooperates with the hook member 24 formed at one end of the bell crank lever 25 which is pivotally connected with the rod 12, centrally thereof. One arm of the bell crank lever extends downwardly where it has connection with the controlling rod 26 which has its rear end connected with the bell crank lever 27 that is pivotally connected adjacent to the body of the motor vehicle. The reference character 28 designates a pedal member which has pivotal connection with one arm of the bell crank lever and is constructed so that upon a downward movement of the pedal, the bell crank lever will be operated to release the hook members 23 and 24 allowing the movable fender to fall down to its active position.

A coiled spring 29 embraces the lower portion of the pedal 28 and is designed to return the pedal to its normal position after it has been actuated to release the forward fender.

In the form of the invention as illustrated by Figure 3 of the drawing, the rods that support the curved rods 11 and 14 may be of a telescoping construction, allowing the widths of the fenders to be regulated to meet various requirements and adapt the device for use in connection with motor vehicles of various sizes. In this form of the invention one of the rods indicated at 30 is formed with an extension 31 adapted to fit in the open end of the tubular section 32, supporting members 33 being provided for supporting the fenders, and holding them in their various positions of adjustment.

I claim:—

1. In a device of the character described, an inner stationary fender and an outer movable fender, each of said fenders including supporting rods and rearwardly curved rods extending at right angles to the supporting rods, a hook member carried by the forward fender section, and a manually controlled latch member adapted to cooperate with the hook member for normally holding the movable fender section in its inactive position.

2. In a device of the character described, a stationary fender section and a movable fender section, arms for supporting the stationary fender section, said movable fender section having pivotal connection with the arms, a tubular member forming a part of the movable fender section, and manually controlled means for releasing the movable section and allowing the movable section to move to its inactive position.

3. In a device of the character described, a stationary fender section and a movable fender section pivotally connected with the stationary fender section, supporting rods forming a part of each fender section, said supporting rods being of the telescoping type to permit of lateral adjustment thereof, and means for controlling the movements of the movable fender section.

In testimony that I claim the foregoing as my own, I have hereto affixed my signature in the presence of two witnesses.

JOHN WILLIAM STOKES TUCKER.

Witnesses:
HADDIE A. HOWARD,
E. K. HOWARD.